United States Patent [19]
Dever et al.

[11] Patent Number: 5,810,894
[45] Date of Patent: Sep. 22, 1998

[54] MONOAMINES AND A METHOD OF MAKING THE SAME

[75] Inventors: James L. Dever, Medina; Larry J. Baldwin, Berea; James D. Kinder, New Middletown, all of Ohio

[73] Assignee: Ferro Corporation, Cleveland, Ohio

[21] Appl. No.: 770,245

[22] Filed: Dec. 20, 1996

[51] Int. Cl.⁶ .................................................. C10L 1/22
[52] U.S. Cl. .................... 44/412; 508/545; 575/333.7; 575/333.8; 575/374; 575/379
[58] Field of Search ............................ 525/333.7, 333.8, 525/374, 379; 44/412; 508/545

[56] References Cited

U.S. PATENT DOCUMENTS

| | | | |
|---|---|---|---|
| 3,454,555 | 7/1969 | van der Voort | 260/239 |
| 3,480,580 | 11/1969 | Joyner et al. | 260/29.6 |
| 3,565,804 | 2/1971 | Honnen et al. | 252/50 |
| 3,579,486 | 5/1971 | McConnell et al. | 260/78.4 |
| 3,671,511 | 6/1972 | Honnen et al. | 260/93.7 |
| 3,794,586 | 2/1974 | Kimura et al. | |
| 3,898,056 | 8/1975 | Honnen | |
| 3,960,515 | 6/1976 | Honnen | |
| 4,022,589 | 5/1977 | Alquist et al. | 44/432 |
| 4,032,700 | 6/1977 | Song et al. | 526/43 |
| 4,055,402 | 10/1977 | Battersby et al. | |
| 4,382,005 | 5/1983 | Miller | |
| 4,526,936 | 7/1985 | Jachimowicz et al. | 525/379 |
| 4,558,101 | 12/1985 | Jachimowicz et al. | 525/379 |
| 4,832,702 | 5/1989 | Kummer et al. | 44/62 |
| 5,103,061 | 4/1992 | Blackborow et al. | 525/379 |
| 5,346,965 | 9/1994 | Dever et al. | 525/379 |
| 5,583,186 | 12/1996 | Duncan | 525/379 |

FOREIGN PATENT DOCUMENTS

| | | |
|---|---|---|
| 0476485A1 | 9/1991 | European Pat. Off. |
| 382405 | 11/1994 | European Pat. Off. |
| WO9212221 | 7/1992 | WIPO |
| WO9214806 | 9/1992 | WIPO |
| WO9414929 | 7/1994 | WIPO |

OTHER PUBLICATIONS

Kennedy et al., "Carbocationic Polymerization" pp. 468–481, John Wiley & Sons date unknown.

"Encyclopedia Of Polymer Science And Engineering," vol. 2, pp. 590–604, John Wiley & Sons date unknown.

*Primary Examiner*—Jacqueline V. Howard
*Assistant Examiner*—Cephia Toomer
*Attorney, Agent, or Firm*—Rankin, Hill, Porter & Clark LLP

[57] ABSTRACT

The present invention provides a novel oligomeric olefin monoamine for use as an additive in fuel and related products and a method of producing the same. The oligomeric olefin monoamine is free of any undesirable halogens. The method of making the oligomeric olefin includes the steps of forming an oligomeric olefin epoxide, converting the epoxide to an alcohol and then converting the alcohol through the use of ammonia to an oligomeric olefin monoamine.

20 Claims, No Drawings

MONOAMINES AND A METHOD OF MAKING THE SAME

FIELD OF INVENTION

The present invention concerns novel oligomeric olefin monoamines and methods of making the same. More particularly, the present invention concerns new halogen-free oligomeric olefin monoamines that when added to fuels can be used to control or limit the formation of undesirable deposits in various components of combustion engines.

BACKGROUND

Deposit control fuel additives are well-known in the prior art. Such additives serve to limit the formation of unwanted deposits in engine intake systems (e.g., carburetors, manifolds, valves, fuel injectors, combustion chambers, etc.).

A significant deposit control fuel additive that is currently employed in today's fuels is made by the chlorination of polybutene followed by the amination of the chlorinated polybutene to yield a polybutene amine. The polybutene amines typically contain from about 0.25 to about 1.0 percent residual chlorine.

In light of today's concerns regarding halogen compounds, it is desirable to reduce or eliminate the presence of chlorine or other halogens in fuel additives. The present invention meets this need for it provides a process and a material that is free of any halogens.

SUMMARY OF THE INVENTION

The present invention provides a novel halogen-free additive including oligomeric olefin monoamines having the formula:

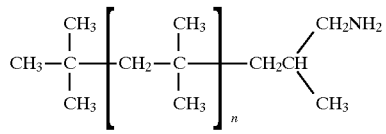

The additive may also include an oligomeric olefin monoamine having the formula:

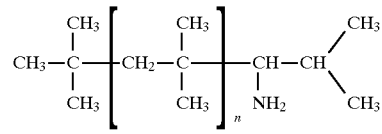

The invention may also include an olefin oligomer monoamine having the following structure:

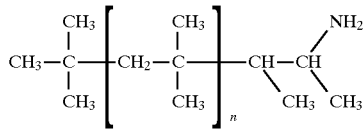

The oligomeric olefin monoamine is produced by first epoxidizing a specific class of oligomeric olefins to provide epoxidized oligomeric olefins, converting the epoxidized oligomeric olefin to an alcohol, and then aminating the alcohol to provide the oligomeric olefin monoamine. The oligomeric olefin that may be employed in the production of the oligomeric olefin monoamine is any oligomeric olefin with unsaturation in the terminal monomer unit.

The oligomeric olefin monoamine of the present invention is useful as an additive in fuels and lubricating oils.

The foregoing and other features of the invention are hereinafter more fully described and particularly pointed out in the claims and the following description setting forth in detail certain illustrative embodiments of the invention, these being indicative, however, of but a few of the various ways in which the principles of the present invention may be employed.

DETAILED DESCRIPTION

The present invention provides an oligomeric olefin monoamine that is essentially halogen free. The oligomeric olefin monoamine has the following formula or structure:

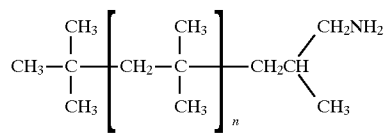

The invention may also provide oligomeric olefin monoamines having the following structures:

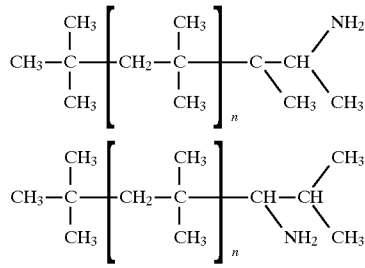

The oligomeric olefin monoamine of the present invention is useful as an additive for use in fuels and oils. Fuels include, for example, gasoline or motor fuels, aviation fuels, marine fuels and diesel fuels. Oils include, for example, crankcase oils, transmission oils and gear oils.

Generally, the oligomeric olefin monoamine of the present invention is produced by epoxidizing an oligomeric olefin to provide an epoxidized oligomeric olefin, converting the epoxidized oligomeric olefin to an alcohol and then aminating the alcohol to provide the oligomeric olefin monoamine. The oligomeric olefin monomaine includes a molecular weight of from about 400 to about 3,000.

The oligomeric olefin utilized to produce the monoamine of the present invention may be derived from various sources including polyisobutylenes and polybutenes. The key to the oligomeric olefin that is useful in the practice of the present invention is that such oligomeric olefin must display unsaturation in the terminal monomer unit. Polybutene is the commercial name for oligomers manufactured from $C_4$ olefin refinery streams of catalytic or steam-cracked petroleum. The olefinic portion of these $C_4$ fractions consist mainly of isobutylene, but also contain other $C_4$ olefins. Products consisting entirely of polyisobutylene are also commercially available.

Commercial polyisobutylene provides a material having the following chemical structure in its terminal monomer unit:

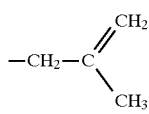

Additional end group structures that may also be present in commercial polyisobutylenes and polybutenes are as follows:

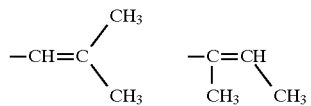

These oligomeric olefins will also produce oligomeric olefin monoamines using the process of the present invention. At least two of the above structures can be found in commercially available polybutene products (although the ratio of these structures generally differs depending on the nature of the catalysts used to produce polybutenes and polyisobutylenes).

The average molecular weight of commercial polybutenes and commercial polyisobutylenes of interest is generally greater than about 400, preferably from about 400 to about 3,000, more preferably from about 600 to about 2,200 and most preferably from about 800 to about 1,600. Notwithstanding the foregoing ranges, it is understood that the practice of the present invention is possible with any commercially available polybutene or polyisobutylene oligomers having any number average molecular weight between about 400 and 3000, and having unsaturation in the terminal unit.

Typical useful polyisobutylenes and polybutenes that are commercially available today include, for example, Indopol® H300 (Mn 1300) from Amoco; Parapol® 950 (Mn 950) or Parapol® 1300 (Mn 1300) both from Exxon; Napvis® 30 (Mn 1300) or Ultravis® 10 (Mn 950) or Ultravis® 30 (Mn 1300) all from British Petroleum and Glissopal® ES 3250 (Mn 1000) from BASF.

The initial step of the preparation of the compositions of the present invention is epoxidation of the unsaturation in the oligomeric olefin. Preferably, the epoxidation reaction occurs by reacting the oligomeric olefin with hydrogen peroxide in the presence of an organic carboxylic acid. Due to the high viscosity of the starting oligomeric olefins, the epoxidation reaction is desirably carried out in a hydrocarbon solvent.

The amount of the hydrogen peroxide is generally from about 0.5 to about 2.5, and preferably from about 1.5 to about 2.0 moles per mole of olefin based upon the number average molecular weight of the olefin. The organic carboxylic acid is generally a monocarboxylic acid having a total of from 2 to 4 carbon atoms with acetic acid being preferred. The amount of the organic carboxylic acid is generally from about 0.15 to about 0.5 moles, and preferably from 0.25 to about 0.40 moles per mole of olefin based upon the number average molecular weight of the olefin. In addition to this organic carboxylic acid, an acid catalyst is also required. The acid catalyst can be one or more organic acids, or one or more inorganic acids, or combinations thereof which are utilized to effect the epoxide reaction. Such a reaction is described in *Organic Peroxides,* Vol. 1, Wiley-InterScience, New York, 1970, Daniel Swern, at pages 340–369, which is hereby fully incorporated by reference. Examples of specific acid catalysts include methanesulfonic acid, toluenesulfonic acid, sulfuric acid, phosphoric acid and the like and are utilized in small amounts as from about 0.0025 to about 0.030 moles per mole of the olefin based upon the number average molecular weight thereof.

The hydrocarbon solvent utilized in the epoxidation reaction can generally be any inert organic solvent, that is a solvent which does not enter into reaction with any of the reactants. Such solvents include aromatic solvents having a total of from about 6 to about 9 carbon atoms with specific examples including xylene, toluene, $C_9$ aromatic and the like, an aliphatic solvent having from about 6 to about 10 carbon atoms with specific examples including isooctane, heptane, cyclohexane and the like, or various aliphatic substituted aromatic compounds and the like, as well as combinations thereof.

The temperature of the epoxidation reaction will depend on the organic acid used and is a function of the stability of the intermediate peracid and the reaction rate thereof. For acetic acid, the reaction temperature is generally from about 60° C. to about 85° C., desirably from about 75° C. to about 85° C., and preferably from about 78° C. to 82° C. Suitable reaction temperatures for other organic carboxylic acid reactants will range according to the stability of the intermediate peracid and their reactivity. Some acids can be run at reaction temperatures as low as 20° C. Inasmuch as the reaction is exothermic, it is generally necessary to cool the reaction after it has commenced to maintain the temperature within the above ranges. The reaction is generally conducted at atmospheric pressure, preferably under an inert atmosphere such as nitrogen.

The epoxide is a viscous, colorless to light yellow liquid which can be isolated by the removal of the solvent by a variety of conventional techniques such as vacuum stripping, wiped film evaporation and the like. The degree of epoxidation or conversion is generally about 90 percent. The resulting intermediate is used without further purification in the subsequent reduction step.

It will be appreciated that epoxidation can be achieved by any of the methods employed in the conversion of olefins to epoxides, and the present invention is not limited to the above described technique. Also, it will be appreciated that various reagents can be used to effect epoxidation including, for example, t-butyl hydroperoxide, peracetic acid and m-chloroperbenzoic acid.

The epoxidation step yields materials with the following end group structures:

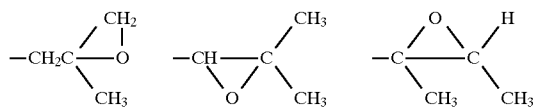

In a subsequent step of the process, the epoxide is converted to an alcohol by catalytic reaction with hydrogen. This hydrogenation is performed at elevated temperatures and pressures in the presence of a metal catalyst. Examples of suitable metal catalysts include Raney nickel, nickel on kieselguhr, copper chromite, platinum on carbon, Raney cobalt and palladium on carbon systems. Raney nickel is a preferred metal catalyst. This hydrogenation step is also performed using hydrogen gas at a pressure of at least about 400 psi. Hydrogenation may proceed at any temperature. However, in order to have rates consistent with commercial practice a temperature of about 125° C. or higher is preferred. Preferably, the temperature of the reaction does not exceed about 250° C. During pressurization and heating, the hydrogenation vessel is preferably agitated. Organic solvents such as methylcyclohexane, xylene, toluene, $C_9$ aromatic solvent and hydrocarbons such as isooctane, heptane, cyclohexane and various aliphatic substituted aromatic compounds or mixtures of the foregoing may be added to the vessel to reduce viscosity. However, solvent selection should be made carefully so as to avoid reduction of the solvent during hydrogenation.

The alcohol prepared by the hydrogenation is predominately the anti-Markovnikov product. This product is the preferred product for the amination as well. Other methods used to produce the anti-Markovnikov product employ lithium aluminum hydride with aluminum chloride, a mixture of lithium dissolving metal reduction in ethyl amine and butanol, and mixtures of diborane and sodium borohydride. Other methods for the reduction of an epoxide to an alcohol are outlines in the series "Compendium of Organic Synthetic Methods," Wiley-InterScience, New York, 1971, Ian T. Harrison and Shuyen Harrison or "Advanced Organic Chemistry," John Wiley and Sons, New York, 1992, Jerry March, pages 443 and 444. Such references are incorporated herein by reference for the teachings relative to hydrogenation.

The alcohol may be removed from the vessel and then the amination may be performed as a wholly separate step. However, it will be appreciated that the amination step may also be conducted in the same vessel. If desired, the alcohol solution can be separated from the catalyst using such conventional techniques as filtering or decantation.

The alcohol formation step yields materials with the following structures:

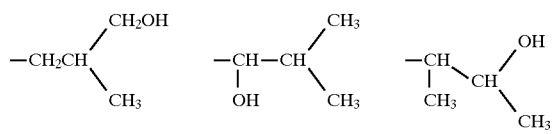

The next step of the process is the amination of the alcohol. Amination is conducted using liquid ammonia ($NH_3$) under elevated pressure and temperature in the presence of a metal catalyst. Examples of suitable metal catalysts are discussed above, with Raney nickel once again being a preferred metal catalyst. Amination is performed using ammonia gas at a pressure of from at least about 1000 psi and a temperature of at least about 150° C. Preferably, amination is not conducted using a temperature in excess of about 260° C. From about 2 to about 200 moles of $NH_3$ are used for every mole of alcohol product being converted. In addition to the $NH_3$, hydrogen gas is preferably charged to the vessel so as to increase the vessel pressure 100 to about 500 psi beyond the level created by the $NH_3$ gas.

During amination, the vessel is preferably agitated. Organic solvents such as those listed above in connection with the hydrogenation step may be added to the vessel to promote agitation. Also, preferably amination is performed using the addition of a side reaction suppressant that serves to suppress the formation of undesirable secondary amines. Examples of such side reaction suppressants include, for example, carboxylic acids such as acetic acid. Additionally, it is believed that the addition of materials such as glymes or polyethers may be used during amination to enhance the solubility of the ammonia thereby helping to suppress the formation of undesirable secondary amines.

After amination, the amine is separated from the catalyst (e.g., by filtration) and is recovered by solvent stripping.

Amination yields materials with the following end group structures:

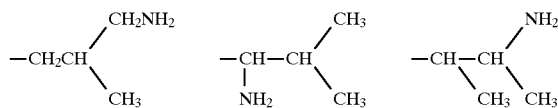

The oligomeric olefin monoamine final product that is generated by the process may be diluted with solvent(s), for example, $C_9$ aromatic solvent or toluene, to the desired percent basic nitrogen as is well-known in the art. Dilution facilitates mixing of the final product with the oil or fuel to which it is to be added. The final product can also be added to a carrier to facilitate its use. The carrier may have a synergistic effect on the properties of the final product. Suitable carriers include conventional products such as mineral oils and poly(oxyalkylene) derivatives. The final product of the present invention will generally be employed in a hydrocarbon distillate fuel boiling in the gasoline or diesel range, but use of the final product in other fuels such as aviation and marine fuel is also contemplated. Generally, a dilution of from about 50 ppm to about 2000 ppm additive in the fuel is desired.

In order to demonstrate practice of the present invention, the following illustrative examples are provided. The specific embodiments described below are intended to illustrate, but not to limit, the present invention.

EXAMPLE I

Epoxidation Of Polyolefin

A 1.0 L flask was charged with 300 g of Ultravis 10 (British Petroleum polybutene) and 150 g of heptane. The material was stirred until solution was complete. The reactor was then charged with 7.94 g of glacial acetic acid, 0.97 g of 85% phosphoric acid and 0.7 g of 50% sulfuric acid. The mixture was then heated to 80° C. A constant feed addition funnel was charged with 42.9 g of 70%, hydrogen peroxide. The peroxide was added dropwise to the reaction mixture over the period of one hour. The reaction was then stirred at 80° C. for an additional 6 hours. The reaction was then cooled to room temperature. The aqueous layer was separated and discarded. The organic layer was then washed twice with 300 ml of water. After the organic layer was washed to remove the acids from the product it was then dried and stripped of solvent to yield 303 g of epoxidized polybutene with an oxirane value of 1.27.

EXAMPLE II

Hydrogenation Of Polybutene in Epoxide

Several batches of polybutene epoxide were prepared by using the procedure outlined in Example I to make a large quantity of the epoxide. A 1.8 L Parr reactor was charged with 500 g of the polybutene epoxide. The epoxide was then diluted with 250 ml of methylcyclohexane and 25 g of Raney nickel catalyst were added. The reactor was purged with nitrogen and then evacuated such that there was no oxygen left in the reactor. The reactor was pressurized with 650 psi of hydrogen gas. The agitator was started and the reactor was heated to 160° C. When the reaction reached 160° C., the pressure was adjusted to 900 psi by adding hydrogen. The reactor was stirred at 160° C. for three hours. At the end of the three hours, the pressure in the reactor had dropped to 780 psi at the end of the three hours. The pressure in the reactor was again increased to 900 psi by adding hydrogen and the reaction was stirred for an additional hour at 160° C. The reactor was then cooled to room temperature and the pressure in the reactor was vented until the pressure in the reactor was equal to atmospheric pressure. The product was removed from the reactor, and the catalyst was removed from the product by filtration. The solvent was removed from the product by distillation to give 400 g of the polybutene alcohol. NMR analysis indicated that the epoxide was 82% converted to the terminal alcohol.

EXAMPLE III

Amination Of The Polybutene Alcohol

A 1.0 L Parr reactor was charged with 140.78 g of polybutene alcohol prepared as outlined in Example II. The reactor was then charged with 17.52 g of Raney nickel, 120.77 g of xylene and 25.09 g of water. The reactor was sealed, purged with nitrogen, and charged with 151.7 g of liquid anhydrous ammonia. A hydrogen cylinder was attached to the reactor and the pressure of the reactor was increased by 150 psi with hydrogen. The agitator was started and the reactor was heated to 230° C. The pressure of the reaction when the reactor reached 230° C. was 3100 psig. The reaction was stirred for 16 hours at 230° C. The reaction was then cooled to room temperature and the pressure of the reactor was vented into a scrubber system to trap the unreacted ammonia. The product solution was then removed from the reactor, and the catalyst was then removed by filtration. To remove any unreacted ammonia from the product the product solution was then washed twice with 150 ml of water. The water washes were separated and discarded. The product solution was dried and stripped of solvent. Analysis of the product to determine the % basic nitrogen revealed that this reaction gave product with 0.35% basic nitrogen which represents a 34% conversion based on available hydroxyl group.

EXAMPLE IV

Amination Of The Polybutene Alcohol

A 1.0 L Parr reactor was charged with 129.4 g of polybutene alcohol prepared as outlined in Example II. The reactor was then charged with 26.5 g of Raney nickel and 138.7 g of xylene. The reactor was sealed and purged with nitrogen. The reactor was charged with 250 g of liquid anhydrous ammonia. A hydrogen cylinder was attached to the reactor and the pressure of the reactor was increased by 100 psi with hydrogen. The agitator was started and the reactor was heated to 220° C. The pressure of the reaction when the reactor reached 220° C. was adjusted to 3000 psig by venting excess pressure. The reaction was stirred for 16 hours at 220° C. The reaction was then cooled to room temperature and the pressure of the reactor was vented into a scrubber system to trap the unreacted ammonia. The product solution was then removed from the reactor, and the catalyst was removed from the product solution by filtration. The product solution was washed twice with 150 ml of water to remove any unreacted ammonia. The water washes were separated and discarded. The product solution was then dried and stripped of solvent. Analysis of the product for t basic nitrogen revealed that this reaction gave product with 0.39% basic nitrogen which represents a 38% conversion based on available hydroxyl group.

EXAMPLE V

Amination Of The Alcohol With Acetic Acid

A 1.0 L Parr reactor was charged with 166.82 g of Ultravis 10 alcohol prepared as outlined above in Example II. The reactor was then charged with 18.0 g of Raney nickel and 166.08 g of xylenes, and 11 g of glacial acetic acid. The reactor was sealed and purged with nitrogen. The reactor was charged with 150.1 g of liquid anhydrous ammonia. A hydrogen cylinder was then attached to the reactor, and the pressure of the reactor was increased by 250 psi with hydrogen. The agitator was started, and the reactor was heated to 220° C. The pressure of the reaction when the reactor reached 220° C. was adjusted to 2200 psig. The reaction was stirred for 16 hours at 220° C. The reaction was then cooled to room temperature, and the pressure of the reactor was vented into a scrubber system to trap the unreacted ammonia. The product solution was then removed from the reactor, and the catalyst was removed from the product solution by filtration. The solution of the product was washed with 150 ml of water to remove any unreacted ammonia. The water washes were separated and discarded. The product was then dried and stripped of solvent. Analysis of the product for percent basic nitrogen revealed that this reaction gave product with 0.63% basic nitrogen which represents a 63% conversion based on available alcohol.

It is to be appreciated that practice of the present invention is not limited to the specifics disclosed herein, the examples having been provided merely to enable those skilled in the art to have means by which to evaluate the present invention. Accordingly, it is well within the scope of this invention to vary the reaction conditions set forth herein as may be necessary to accommodate the reactants selected. Noncritical steps in the recovery of the product can be varied depending on the equipment employed as well as the preference of the operator.

Based upon the foregoing disclosure, it should now be apparent that the process of the present invention will carry out the objects set forth hereinabove. It is, therefore, to be understood that any variations evident fall within the scope of the claimed invention and thus, the selection of specific reactants as well as processing conditions can be determined without departing from the spirit of the invention herein disclosed and described. In particular, deposit control additives according to the present invention are not necessarily limited to those having the polyolefins exemplified herein or the mole ratios employed. Moreover, as noted hereinabove, other reaction temperatures can be substituted for those disclosed herein. Thus, the scope of the invention shall include all modifications and variations that may fall within the scope of the following claims.

What is claimed:

1. A halogen-free additive composition for use in fuels and oils including an oligomeric olefin monoamine having a molecular weight of from about 400 to about 3,000 and having the formula:

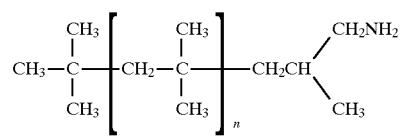

2. A halogen-free additive as set forth in claim 1 further including an oligomeric olefin monoamine having a molecular weight of from about 400 to about 3,000 and having at least one of the following formulas:

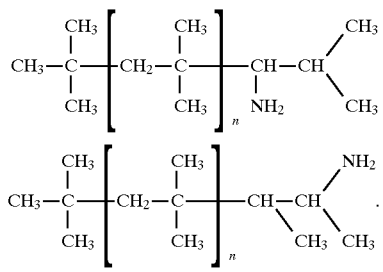

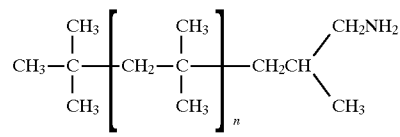

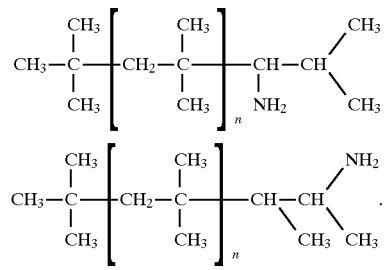

3. A halogen-free additive composition as set forth in claim 1 wherein said oligomeric olefin comprises polyisobutylene.

4. A method of forming a halogen-free oligomeric olefin monoamine composition for use as an additive comprising the steps of:
   A) providing an oligomeric olefin;
   B) epoxidizing the oligomeric olefin to provide epoxidized oligomeric olefin;
   C) converting the epoxidized oligomeric olefin to an alcohol; and
   D) aminating the alcohol product of said step C to provide the oligomeric olefin monoamine.

5. A method as set forth in claim 4 wherein said oligomeric olefin comprises an oligomeric olefin that displays unsaturation in the terminal monomer unit of the oligomeric olefin.

6. A method as set forth in claim 4 wherein said oligomeric olefin comprises polyisobutylene or polybutene.

7. A method as set forth in claim 4 wherein said oligomeric olefin includes materials having the following end group structure:

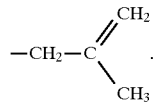

8. A method as set forth in claim 4 wherein said epoxidation step B yields a product having the following end group structure:

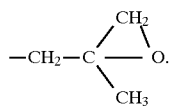

9. A method as set forth in claim 4 wherein during said step C said epoxidized oligomeric olefin is converted to an alcohol by catalytic reaction with hydrogen.

10. A method as set forth in claim 4 wherein during said step D said alcohol is aminated using ammonia in the presence of a metal catalyst and a side reaction suppressant.

11. A fuel composition comprising an additive, said additive including an oligomeric olefin monoamine having a molecular weight of from about 400 to about 3,000 and having the formula:

12. A fuel composition as set forth in claim 11 wherein said additive includes an oligomeric olefin monoamine having a molecular weight of from about 400 to about 3,000 and having at least one of the following formulas:

13. A fuel composition as set forth in claim 11 comprising a material selected from the group consisting of aircraft fuel, gasoline, marine fuel and diesel fuel.

14. A method of producing an oligomeric olefin monoamine for use as an additive comprising the steps of:
   I. providing a source of oligomeric olefin;
   II. epoxidizing the oligomeric olefin by reacting the oligomeric olefin with hydrogen peroxide in the presence of an organic acid and an acid catalyst to provide epoxidized oligomeric olefin;
   III. converting the epoxidized oligomeric olefin to an alcohol by catalytic reaction with hydrogen; and
   IV. converting the alcohol to an oligomeric olefin monoamine using ammonia in the presence of a metal catalyst.

15. A method as set forth in claim 14 wherein said organic acid of said Step II comprises a carboxylic acid.

16. A method as set forth in claim 14 wherein said Step III is conducted in the presence of a metal catalyst.

17. A method as set forth in claim 16 wherein said metal catalyst comprises a material selected from the group consisting of Raney nickel, copper chromite, platinum and palladium.

18. A method as set forth in claim 14 wherein said Step IV is conducted in the presence of a side reaction suppressant.

19. A method as set forth in claim 18 wherein said side reaction suppressant comprises a material selected from the group consisting of a carboxylic acid, a glyme and a polyether.

20. A method as set forth in claim 14 wherein during said Step IV hydrogen gas is utilized along with said ammonia.

* * * * *